(12) United States Patent
Takamoto et al.

(10) Patent No.: US 11,220,968 B2
(45) Date of Patent: Jan. 11, 2022

(54) INTERNAL COMBUSTION ENGINE CONDITION DETERMINATION APPARATUS, INTERNAL COMBUSTION ENGINE CONDITION DETERMINATION SYSTEM, AND DATA ANALYZING APPARATUS

(71) Applicant: TOYOTA JIDOSHA KABUSHIKI KAISHA, Toyota (JP)

(72) Inventors: Satoshi Takamoto, Miyoshi (JP); Atsushi Nagai, Toyota (JP); Yohsuke Hashimoto, Nagakute (JP); Masakazu Aoki, Nagoya (JP); Tatsunobu Murai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/086,984

(22) Filed: Nov. 2, 2020

(65) Prior Publication Data
US 2021/0222641 A1 Jul. 22, 2021

(30) Foreign Application Priority Data
Jan. 17, 2020 (JP) .............................. JP2020-005784

(51) Int. Cl.
*F02D 41/14* (2006.01)
*F02D 41/22* (2006.01)
*F02D 41/24* (2006.01)

(52) U.S. Cl.
CPC ......... *F02D 41/1405* (2013.01); *F02D 41/22* (2013.01); *F02D 41/2441* (2013.01); *F02D 41/2451* (2013.01); *F02D 2041/1433* (2013.01); *F02D 2200/101* (2013.01)

(58) Field of Classification Search
CPC ...... F02D 41/14; F02D 41/1405; F02D 41/22; F02D 41/2441; F02D 41/2451; F02D 2041/1433; F02D 2200/101
See application file for complete search history.

(56) References Cited

U.S. PATENT DOCUMENTS 11,099,102 B2 * 8/2021 Muto ................... G06N 3/0481

FOREIGN PATENT DOCUMENTS

JP        6593560 B1    10/2019

* cited by examiner

*Primary Examiner* — Hieu T Vo
(74) *Attorney, Agent, or Firm* — Oblon, McClelland, Maier & Neustadt, L.L.P.

(57) ABSTRACT

A CPU calculates probability models by inputting input variables to a neural network. Next, the CPU determines whether a maximum value among the calculated probability models is larger than an upper limit value of a permissible range. When the maximum value is larger than the upper limit value of the permissible range, the CPU calculates a difference between the maximum value and a first reference value within the permissible range, and subtracts the difference from all the probability models. Then, the CPU calculates a probability of misfire in each cylinder by inputting each of the calculated probability models to a softmax function of mapping.

10 Claims, 10 Drawing Sheets

INTERNAL COMBUSTION ENGINE CONDITION DETERMINATION APPARATUS, INTERNAL COMBUSTION ENGINE CONDITION DETERMINATION SYSTEM, AND DATA ANALYZING APPARATUS

CROSS-REFERENCE TO RELATED APPLICATION

This application claims priority to Japanese Patent Application No. 2020-005784 filed on Jan. 17, 2020, incorporated herein by reference in its entirety.

BACKGROUND

1. Technical Field

The present disclosure relates to an internal combustion engine condition determination apparatus, an internal combustion engine condition determination system, and a data analyzing apparatus.

2. Description of Related Art

Japanese Patent No. 6593560 (JP 6593560 B) describes a misfire detection apparatus for an internal combustion engine. In the misfire detection apparatus, a memory stores mapping data trained by machine learning. A processor calculates a probability of misfire by inputting input variables to mapping defined by the mapping data. The mapping includes a neural network and a softmax function for normalizing a plurality of output values from the neural network. The softmax function calculates the ratio of each output value to the sum of the plurality of output values from the neural network.

SUMMARY

In the misfire detection apparatus for the internal combustion engine as described in JP 6593560 B, it is necessary to prevent the output values from the neural network from falling out of a range of values that can be calculated by the processor. For example, when the output values are larger than an upper limit value of a permissible range, a guard process may be executed to uniformly set the output values to agree with the upper limit value.

When the guard process is executed for the output values from the neural network, a plurality of output values equal to the upper limit value may be output though the output values differ from one another before the guard process is executed. When the output values are normalized by the softmax function in this situation, the normalization does not reflect a magnitude relationship of the output values that differ from one another before the guard process is executed. Thus, the normalization is not always appropriate.

An internal combustion engine condition determination apparatus according to a first aspect of the present disclosure includes a memory and a processor. The memory stores mapping data for defining mapping that uses an internal combustion engine state variable as an input and outputs a determination result related to a condition of an internal combustion engine. The internal combustion engine state variable is a parameter indicating the condition of the internal combustion engine. The mapping includes a neural network and a softmax function for normalizing a plurality of output values from the neural network. The processor is configured to acquire the internal combustion engine state variable, input the acquired internal combustion engine state variable to the neural network of the mapping, execute, when a maximum value among the plurality of output values from the neural network falls out of a predetermined permissible range, a guard process for obtaining a new output value by adjusting the maximum value to a value within the permissible range, normalize the output values with the softmax function, and make determination about the determination result related to the condition of the internal combustion engine based on at least a maximum normalized value among normalized values obtained by normalizing the output values. The processor is configured to obtain new output values in the guard process by adjusting the output values other than the maximum value among the plurality of output values from the neural network without changing a magnitude relationship with the other output values.

In the first aspect, the processor may be configured to obtain, when the maximum value among the plurality of output values from the neural network is larger than an upper limit value of the predetermined permissible range, the new output value in the guard process by reducing the maximum value to the value within the permissible range.

According to the first aspect, when the guard process is executed, not only the maximum value but also the output values other than the maximum value are reduced. At this time, the magnitude relationship between the maximum value and the other output values does not change. Therefore, the output values are normalized by the softmax function while keeping the magnitude relationship between the maximum value and the other output values. As a result, even if the output values from the neural network are larger than the upper limit value of the permissible range, the determination can be made in the determination process about the condition of the internal combustion engine based on an appropriate magnitude relationship.

In the first aspect, the processor may be configured to reduce, in the guard process, the maximum value among the output values to a value that falls within the permissible range and is equal to or larger than a second lower limit value larger by a predetermined amount than a first lower limit value of the permissible range.

According to the first aspect, the reduced maximum value is equal to or larger than the second lower limit value larger than the first lower limit value of the permissible range. Therefore, a difference between the reduced maximum value and the lower limit value of the permissible range is large to some extent. Thus, the guard process increases a possibility that not only the maximum value but also the second and subsequent output values fall within the permissible range.

In the first aspect, the processor may be configured to obtain, when the maximum value among the plurality of output values from the neural network is smaller than a first lower limit value that is a lower limit value of the predetermined permissible range, the new output value in the guard process by increasing the maximum value to the value within the permissible range.

According to the first aspect, when the guard process is executed, not only the maximum value but also the output values other than the maximum value are increased. At this time, the magnitude relationship between the maximum value and the other output values does not change. Therefore, the output values are normalized by the softmax function while keeping the magnitude relationship between the maximum value and the other output values. As a result, even if the output values from the neural network are smaller than the first lower limit value of the permissible range, the determination can be made in the determination process about the condition of the internal combustion engine based on an appropriate magnitude relationship.

In the first aspect, the processor may be configured to, when the maximum value among the output values falls within the permissible range and is smaller than a second lower limit value larger than the first lower limit value by a predetermined amount, obtain the new output value in the guard process by increasing the maximum value to a value that is equal to or smaller than an upper limit value of the permissible range and equal to or larger than the second lower limit value, and obtain the new output values in the guard process by increasing the output values other than the maximum value among the plurality of output values from the neural network without changing the magnitude relationship with the other output values.

According to the first aspect, the increased maximum value is equal to or larger than the second lower limit value larger than the first lower limit value of the permissible range. Therefore, a difference between the increased maximum value and the lower limit value of the permissible range is large to some extent. Thus, the guard process increases the possibility that not only the maximum value but also the second and subsequent output values fall within the permissible range.

In the first aspect, the processor may be configured to obtain, when the maximum value before the guard process is smaller than the new output value after the guard process, the new output values in the guard process by increasing the output values other than the maximum value among the plurality of output values from the neural network by amounts corresponding to a difference between the maximum value before the guard process and the new output value after the guard process. The processor may be configured to obtain, when the maximum value before the guard process is larger than the new output value after the guard process, the new output values in the guard process by reducing the output values other than the maximum value among the plurality of output values from the neural network by amounts corresponding to a difference between the maximum value before the guard process and the new output value after the guard process. According to the configuration described above, the output values other than the maximum value are increased or reduced by the amounts equal to the amount for the maximum value through the guard process. Therefore, the magnitude relationship can be kept between the maximum value and the output values other than the maximum value.

In the first aspect, the processor may be configured to set, when a subset of the output values after the guard process is smaller than a first lower limit value that is a lower limit value of the permissible range, the subset of the output values smaller than the first lower limit value to agree with the first lower limit value.

According to the first aspect, through the lower limit process, all the output values fall between the upper limit value and the lower limit value of the permissible range even if any output value is smaller than the first lower limit value of the permissible range as a result of the guard process. The output value that is a guard lower limit value is smaller than the maximum value to some extent. Thus, influence on the determination result is small.

In the first aspect, the condition of the internal combustion engine may be whether the internal combustion engine is misfiring. The mapping data may define mapping that uses, as an input, time-series data of instantaneous speed parameters in a plurality of successive second intervals within a first interval and outputs a probability of misfire in the internal combustion engine. The processor may be configured to acquire the instantaneous speed parameters based on detection values from a sensor configured to detect rotational behavior of a crankshaft of the internal combustion engine. The instantaneous speed parameter may be a parameter based on a rotation speed of the crankshaft of the internal combustion engine. The first interval may be a rotation angle interval of the crankshaft and includes a compression top dead center. The second interval may be smaller than an existence interval of the compression top dead center. The mapping may output the probability of the misfire in at least one cylinder in which the compression top dead center exists within the first interval.

According to the first aspect, the technology of the guard process can be applied for the determination as to whether the internal combustion engine is misfiring. Particularly when determination is made about the condition of the internal combustion engine as typified by whether misfire occurs, there is a possibility that appropriate fuel injection cannot be made and a torque cannot be generated due to an output value outside the permissible range during control for the internal combustion engine based on a result of the determination. Therefore, it is highly necessary to prevent the value outside the permissible range from being input to the softmax function for the determination as to whether the internal combustion engine is misfiring. Thus, it is appropriate to apply the technology of the guard process.

An internal combustion engine condition determination system according to a second aspect of the present disclosure includes a memory, a first processor, and a second processor. The memory stores mapping data for defining mapping that uses an internal combustion engine state variable as an input and outputs a determination result related to a condition of an internal combustion engine. The internal combustion engine state variable is a parameter indicating the condition of the internal combustion engine. The mapping includes a neural network and a softmax function for normalizing a plurality of output values from the neural network. The first processor is mounted on a vehicle, and is configured to acquire the internal combustion engine state variable, transmit acquired data to an outside of the vehicle, and receive a signal based on the determination result related to the condition of the internal combustion engine from the second processor. The second processor is arranged outside the vehicle, and is configured to receive the data transmitted from the first processor, input the received internal combustion engine state variable to the neural network of the mapping, and execute, when a maximum value among the plurality of output values from the neural network falls out of a predetermined permissible range, a guard process for obtaining a new output value by adjusting the maximum value to a value within the permissible range. The guard process includes obtaining new output values by adjusting the output values other than the maximum value among the plurality of output values from the neural network without changing a magnitude relationship with the other output values. The second processor is configured to normalize the output values with the softmax function, make determination about the determination result related to the condition of the internal combustion engine based on at least a maximum normalized value among normalized values obtained by normalizing the output values, and transmit the signal based on the determination result related to the condition of the internal combustion engine to the vehicle. According to the configuration described above, a calculation load on the on-board apparatus can be reduced by executing the input process, the guard process, the normalization process, and the determination process outside the vehicle.

A data analyzing apparatus according to a third aspect of the present disclosure includes a storage device and an execution device. The storage device stores mapping data for defining mapping that uses an internal combustion engine state variable as an input and outputs a determination result related to a condition of an internal combustion engine. The internal combustion engine state variable is a parameter indicating the condition of the internal combustion engine. The mapping includes a neural network and a softmax function for normalizing a plurality of output values from the neural network. The execution device is arranged outside a vehicle, and is configured to receive the internal combustion engine state variable from the vehicle, input the received internal combustion engine state variable to the neural network of the mapping, and execute, when a maximum value among the plurality of output values from the neural network falls out of a predetermined permissible range, a guard process for obtaining a new output value by adjusting the maximum value to a value within the permissible range. The guard process includes obtaining new output values by adjusting the output values other than the maximum value among the plurality of output values from the neural network without changing a magnitude relationship with the other output values. The execution device is configured to normalize the output values with the softmax function, make determination about the determination result related to the condition of the internal combustion engine of the vehicle based on at least a maximum normalized value among normalized values obtained by normalizing the output values, and transmit a signal based on the determination result related to the condition of the internal combustion engine to the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

An internal combustion engine condition determination apparatus according to a first embodiment is described below with reference to the drawings.

Figure 1:
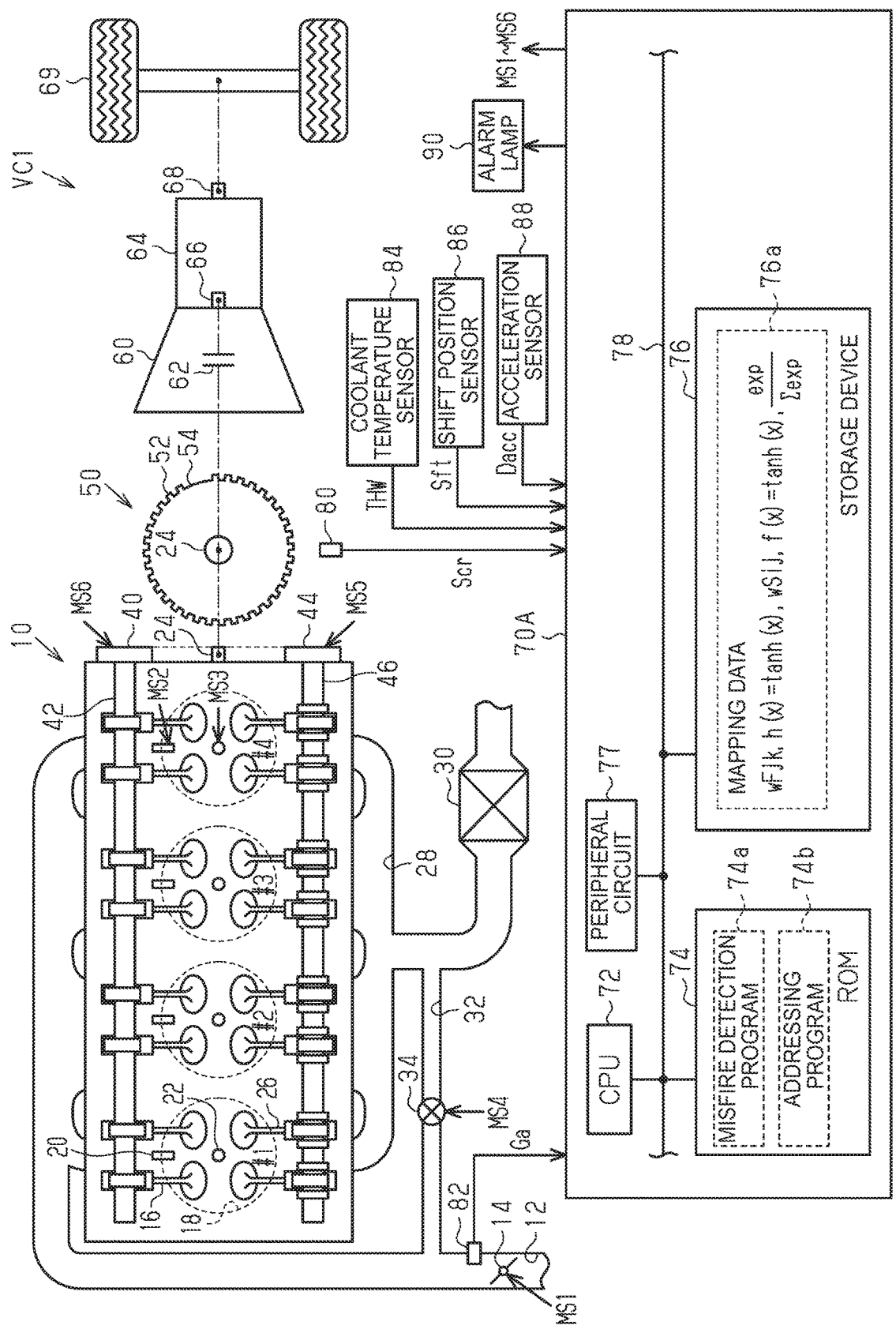
FIG. 1 is a diagram illustrating the configurations of a control apparatus and a vehicle drive system according to a first embodiment.

FIG. 1 illustrates a vehicle VC1 including an internal combustion engine 10. In the internal combustion engine 10, an intake passage 12 is provided with a throttle valve 14. Air taken into the intake passage 12 flows into combustion chambers 18 of cylinders #1, #2, #3 and #4 by opening intake valves 16. The internal combustion engine 10 includes fuel injection valves 20 and ignition devices 22. The fuel injection valve 20 injects fuel. The ignition device 22 causes spark discharge. The fuel injection valve 20 is exposed to the combustion chamber 18. In the combustion chamber 18, an air-fuel mixture containing air and fuel is burned. Energy generated by burning the air-fuel mixture is converted into rotational energy of a crankshaft 24. The burned air-fuel mixture is discharged into an exhaust passage 28 as exhaust gas by opening exhaust valves 26. The exhaust passage 28 is provided with a three-way catalyst 30 having oxygen storage capacity. The exhaust passage 28 communicates with the intake passage 12 via an exhaust gas recirculation (EGR) passage 32. The EGR passage 32 is provided with an EGR valve 34 configured to adjust the channel sectional area of the EGR passage 32.

Rotational power of the crankshaft 24 is transmitted to an intake cam shaft 42 via an intake valve timing changing device 40, and to an exhaust cam shaft 46 via an exhaust valve timing changing device 44. The intake valve timing changing device 40 changes a relative rotational phase difference between the intake cam shaft 42 and the crankshaft 24. The exhaust valve timing changing device 44 changes a relative rotational phase difference between the exhaust cam shaft 46 and the crankshaft 24.

An input shaft 66 of a transmission 64 can be coupled to the crankshaft 24 of the internal combustion engine 10 via a torque converter 60. The torque converter 60 includes a lock-up clutch 62. The crankshaft 24 and the input shaft 66 are coupled together by engaging the lock-up clutch 62. Driving wheels 69 are mechanically coupled to an output shaft 68 of the transmission 64. In this embodiment, the transmission 64 can change a gear ratio from first gear to fifth gear.

A crank rotor 50 is coupled to the crankshaft 24. The crank rotor 50 has a plurality of (34 in this case) teeth 52. Each tooth 52 indicates a rotation angle of the crankshaft 24. The crank rotor 50 basically has the teeth 52 at intervals of 10 degrees in terms of a crank angle (CA). One toothless portion 54 is provided at a position corresponding to an interval of 30 degrees CA between adjacent teeth 52. The toothless portion 54 indicates a reference rotation angle of the crankshaft 24.

A control apparatus 70A controls the internal combustion engine 10. The control apparatus 70A operates the throttle valve 14, the fuel injection valves 20, the ignition devices 22, the EGR valve 34, the intake valve timing changing device 40, and the exhaust valve timing changing device 44 to control, for example, a torque and an exhaust gas component ratio that are control amounts. FIG. 1 illustrates operation signals MS1 to MS6 for the throttle valve 14, the fuel injection valves 20, the ignition devices 22, the EGR valve 34, the intake valve timing changing device 40, and the exhaust valve timing changing device 44.

A crank angle sensor 80 outputs pulses at angle intervals between the teeth 52 (10 degrees CA except the toothless portion 54). To control the control amounts, the control apparatus 70A refers to an output signal Scr from the crank angle sensor 80 and an intake amount Ga detected by an airflow meter 82. The control apparatus 70A also refers to a temperature of a coolant of the internal combustion engine 10 (coolant temperature THW), a shift position Sft of the transmission 64, and an acceleration Dacc in a vertical direction of the vehicle VC1. The coolant temperature THW is detected by a coolant temperature sensor 84. The shift position Sft is detected by a shift position sensor 86. The acceleration Dacc is detected by an acceleration sensor 88.

The control apparatus 70A includes a central processing unit (CPU) 72, a read only memory (ROM) 74, an electrically rewritable non-volatile memory (memory 76), and a peripheral circuit 77, which are communicable with each other via a local network 78. The peripheral circuit 77 includes a circuit configured to generate a clock signal for defining internal operations, a power supply circuit, and a reset circuit.

The control apparatus 70A controls the control amounts in a manner such that the CPU 72 executes programs stored in the ROM 74. The control apparatus 70A executes a process of determining whether the internal combustion engine 10 is misfiring.

Figure 2:
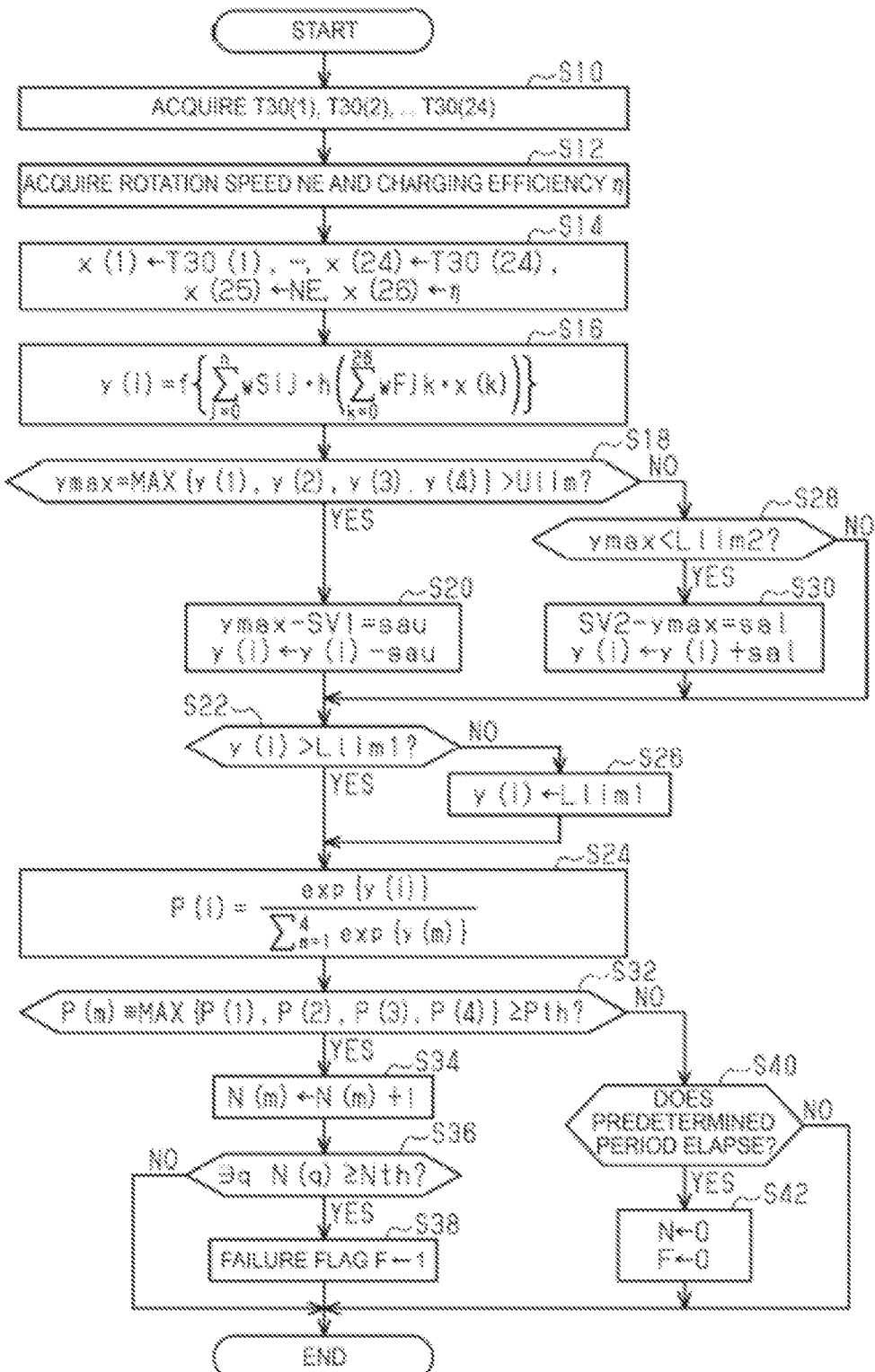
FIG. 2 is a flowchart illustrating a procedure of processes according to the first embodiment.

FIG. 2 illustrates a procedure of a condition determination process. The process illustrated in FIG. 2 is implemented in a manner such that the CPU 72 repeatedly executes a misfire detection program 74a stored in the ROM 74 illustrated in FIG. 1 in, for example, every predetermined period. Step numbers of each process are hereinafter represented by numerals prefixed with "S".

In a series of processes illustrated in FIG. 2, the CPU 72 first acquires infinitesimal rotation times T30(1), T30(2), . . . T30(24) (S10). The infinitesimal rotation time T30 is calculated by the CPU 72 by measuring a time for the crankshaft 24 to rotate by 30 degrees CA based on the output signal Scr from the crank angle sensor 80. The parenthesized numerals of the infinitesimal rotation times that are different (for example, T30(1), T30(2), and the like) indicate the different rotation angle intervals within 720 degrees CA corresponding to one combustion cycle. That is, the infinitesimal rotation times T30(1) to T30(24) indicate rotation times in angle intervals obtained by equally dividing the rotation angle range of 720 degrees CA by 30 degrees CA.

Specifically, the CPU 72 measures a time of rotation by 30 degrees CA based on the output signal Scr, and sets the measured time as a pre-filtering time NF30. Next, the CPU 72 calculates a post-filtering time AF30 through digital filtering using the pre-filtering time NF30 as an input. The CPU 72 calculates the infinitesimal rotation time T30 by normalizing the post-filtering time AF30 such that a difference between a maximum value and a minimum value of the post-filtering time AF30 within a predetermined period (for example, 720 degrees CA) is "1".

Next, the CPU 72 acquires a rotation speed NE and a charging efficiency η (S12). The rotation speed NE is calculated by the CPU 72 based on the output signal Scr from the crank angle sensor 80. The charging efficiency η is calculated by the CPU 72 based on the rotation speed NE and the intake amount Ga. The rotation speed NE is an average of rotation speeds when the crankshaft 24 rotates by angle intervals larger than an interval of existences of compression top dead center (180 degrees CA in this embodiment). The rotation speed NE may be an average of rotation speeds when the crankshaft 24 rotates by rotation angles equal to or larger than a rotation angle of one rotation of the crankshaft 24. The average may be calculated not only by simple averaging but also by, for example, exponential moving averaging. The average is calculated based on a plurality of sampled values of, for example, the infinitesimal rotation time T30 when the crankshaft 24 rotates by a rotation angle equal to or larger than the rotation angle of one rotation. The charging efficiency η is a parameter for defining the amount of air to be charged into the combustion chamber 18.

Next, the CPU 72 substitutes the values acquired through the processes of S10 and S12 into input variables x(1) to x(26) of mapping for calculating the probability of misfire (S14). Specifically, the CPU 72 substitutes an infinitesimal rotation time T30($s$) into an input variable x($s$), provided that "s=1 to 24". That is, the input variables x(1) to x(24) are time-series data of the infinitesimal rotation time T30. Further, the CPU 72 substitutes the rotation speed NE into the input variable x(25) and the charging efficiency η into the input variable x(26).

Next, the CPU 72 calculates a probability P(i) of misfire in a cylinder #i (i=1 to 4) by inputting the input variables x(1) to x(26) to the mapping defined by mapping data 76a stored in the memory 76 illustrated in FIG. 1. The mapping data 76a defines mapping that can output the probability P(i) of misfire occurring in the cylinder #i in a period corresponding to the infinitesimal rotation times T30(1) to T30(24) acquired through the process of S10. The probability P(i) is obtained by quantifying the degree of likelihood of actual misfire based on the input variables x(1) to x(26). In this embodiment, the maximum value of the probability P(i) of misfire in the cylinder #i is smaller than "1", and the minimum value of the probability P(i) is larger than "0". That is, in this embodiment, the probability P(i) is obtained by quantifying the degree of likelihood of actual misfire as a continuous value within a predetermined range of larger than "0" and smaller than "1".

In this embodiment, the mapping includes a neural network having one intermediate layer (hidden layer), and a softmax function. With the softmax function, the sum of probabilities P(1) to P(4) of misfire is "1" by normalizing outputs from the neural network. The neural network includes an input-side coefficient wFjk (j=0 to n, k=0 to 26) and an activation function h(x). The activation function h(x) is input-side nonlinear mapping that nonlinearly converts outputs from input-side linear mapping. The input-side linear mapping is linear mapping defined by the input-side coefficient wFjk. In this embodiment, a hyperbolic tangent "tan h(x)" is exemplified as the activation function h(x). The neural network further includes an output-side coefficient wSij (i=1 to 4, j=0 to n) and an activation function f(x). The activation function f(x) is output-side nonlinear mapping that nonlinearly converts outputs from output-side linear mapping. The output-side linear mapping is linear mapping defined by the output-side coefficient wSij. In this embodiment, a hyperbolic tangent "tan h(x)" is exemplified as the activation function f(x). The value n indicates a dimension of the intermediate Layer. In this embodiment, the value n is smaller than the dimension of the input variable x (26th dimension in this case). An input-side coefficient wFj0 is a bias parameter. When an input variable x(0) is defined as "1", the input-side coefficient wFj0 serves as a coefficient of the input variable x(0). An output-side coefficient wSi0 is a bias parameter, which is multiplied by "1". For example, the multiplication by the value "1" can be achieved when "wF00·x(0)+wF01·x(1)+ . . . " is defined as being identically infinite.

Specifically, the CPU 72 calculates a probability model y(i), which is an output from the neural network defined by the input-side coefficient wFjk, the output-side coefficient wSij, and the activation functions h(x) and f(x). The probability model y(i) is a parameter having a positive correlation with the probability of misfire in the cylinder #i.

To calculate the probability P(i) of misfire, the CPU 72 first calculates the probability model y(i) by inputting the input variables x(1) to x(26) to the neural network (S16).

Next, the CPU 72 determines whether a maximum value ymax among the calculated probability models y(1) to y(4) is larger than an upper limit value Ulim of a permissible range (S18). The permissible range is defined as a maximum range of values to be handled by the CPU 72 as the probability model y(i). The permissible range is equal to or larger than a first lower limit value Llim1 and equal to or smaller than the upper limit value Ulim.

When the maximum value ymax is larger than the upper limit value Ulim of the permissible range (S18: YES), the CPU 72 calculates a difference sau between the maximum value ymax and a first reference value SV1 within the permissible range, and subtracts the difference sau from all the probability models y(i) (S20). That is, the maximum value ymax is reduced to the first reference value SV1 within the permissible range, and the probability models y(i) other than the maximum value ymax are also reduced by amounts corresponding to the same difference sau without changing the magnitude relationship with the other probability models y(i). Thus, new probability models y(i) are obtained. In this embodiment, the first reference value SV1 is set close to an average of the first lower limit value Llim1 and the upper limit value Ulim.

Next, the CPU 72 determines whether the reduced probability models y(1) to y(4) are larger than the first lower limit value Llim1 of the permissible range (S22).

When all the calculated probability models y(1) to y(4) are larger than the first lower limit value Llim1 of the permissible range (S22: YES), the CPU 72 calculates the probability P(i) of misfire in the cylinder #i by inputting each of the calculated probability models y(1) to y(4) to the softmax function of the mapping (S24).

When any one of the calculated probability models y(1) to y(4) is equal to or smaller than the first lower limit value Llim1 of the permissible range (S22: NO), the CPU 72 sets the probability model y(i) equal to or smaller than the first lower limit value Llim1 to agree with the first lower limit value Llim1 (S26). Then, the CPU 72 executes the process of S24.

When the maximum value ymax is equal to or smaller than the upper limit value Ulim of the permissible range (S18: NO), the CPU 72 determines whether the maximum value ymax is smaller than a second lower limit value Llim2 (S28). The second lower limit value Llim2 is defined as a value that falls within the permissible range and is larger than the first lower limit value Llim1. In this embodiment, the second lower limit value Llim2 is set larger than the first lower limit value Llim1 and smaller than the first reference value SV1. The second lower limit value Llim2 is defined in advance through experiment or the like as a value by which an appropriate probability P(i) can be calculated through the process of S24 even if the maximum value ymax is equal to the second lower limit value Llim2 and the other probability models y(i) are equal to the first lower limit value Llim1.

When the maximum value ymax is smaller than the second lower limit value Llim2 of the permissible range (S28: YES), the CPU 72 calculates a difference sal between the maximum value ymax and a second reference value SV2, and adds the difference sal to all the probability models y(i) (S30). The second reference value SV2 is defined in advance as a value equal to or smaller than the upper limit value Ulim and equal to or larger than the second lower limit value Llim2. In this embodiment, the second reference value SV2 is set close to an average of the upper limit value Ulim and the second lower limit value Llim2. The CPU 72 increases the maximum value ymax to the second reference value SV2 within the permissible range, and also increases the probability models y(i) other than the maximum value ymax by amounts corresponding to the same difference sal without changing the magnitude relationship with the other probability models y(i). Thus, new probability models y(i) are obtained. Then, the CPU 72 executes the processes of S22 and S24.

When the maximum value ymax is equal to or larger than the second lower limit value Llim2 of the permissible range (S28: NO), the CPU 72 executes the processes of S22 and S24. The CPU 72 determines whether a maximum value P(m) among the probabilities P(1) to P(4) of misfire that are calculated through the process of S24 is equal to or larger than a threshold Pth (S32). The variable m takes a value of 1 to 4. The threshold Pth is set to "½" or larger. When the CPU 72 determines that the maximum value P(m) is equal to or larger than the threshold Pth (S32: YES), the CPU 72 increments a count N(m) of misfire in a cylinder #m having the maximum probability (S34). The CPU 72 determines whether any one of the counts N(1) to N(4) is equal to or larger than a predetermined count Nth (S36). When the CPU 72 determines that any one of the counts N(1) to N(4) is equal to or larger than the count Nth (S36: YES), the CPU 72 substitutes "1" into a failure flag F under the assumption that a specific cylinder #q (q is one of 1 to 4) is misfiring at a frequency higher than that in the permissible range (S38). At this time, the CPU 72 stores information on the misfiring cylinder #q in the memory 76, and retains the information at least until the misfire ceases in the cylinder #q.

When the CPU 72 determines that the maximum value P(m) is smaller than the threshold Pth (S32: NO), the CPU 72 determines whether a predetermined period elapses from the process of S38 or a process of S42 described later (S40). The predetermined period is longer than a period of one combustion cycle, and may be, for example, 10 times or more as long as the period of one combustion cycle.

When the CPU 72 determines that the predetermined period elapses (S40: YES), the CPU 72 initializes the counts N(1) to N(4) and the failure flag F (S42). When the process of S38 or S42 is completed or when the determination result in the process of S36 or S40 is negative, the CPU 72 temporarily terminates the series of processes illustrated in FIG. 2.

Figure 3:
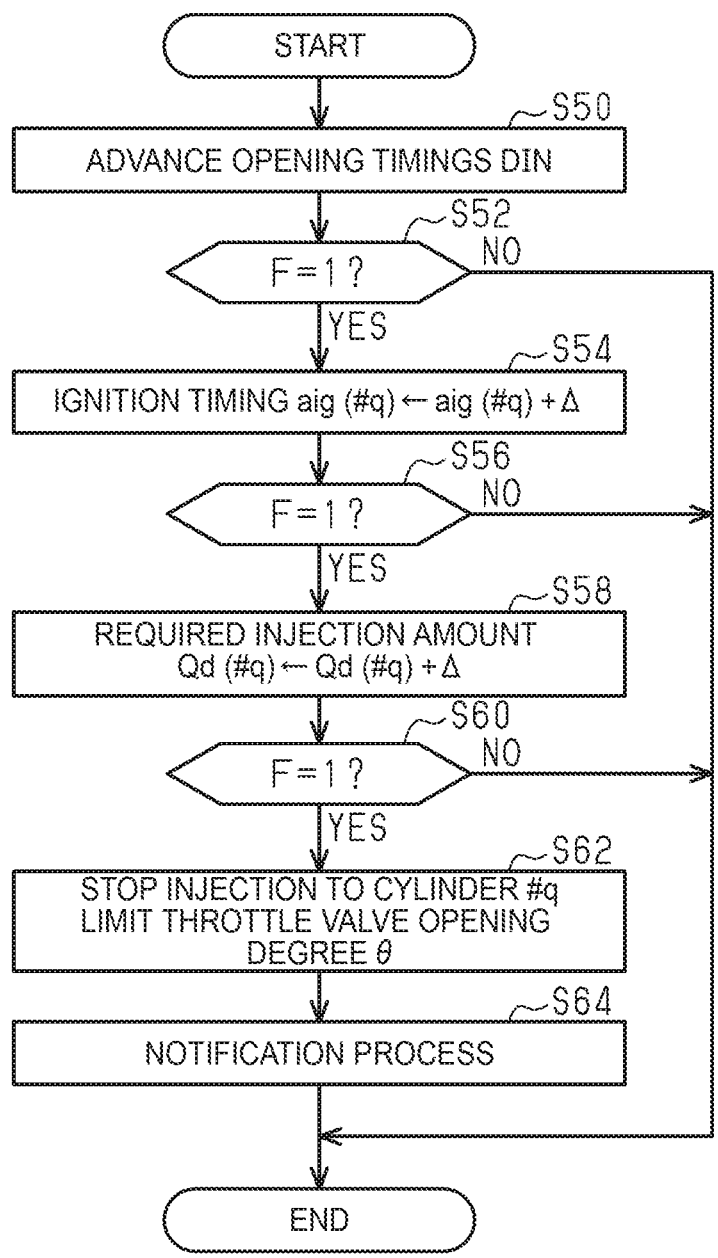
FIG. 3 is a flowchart illustrating a procedure of a misfire addressing process according to the first embodiment.

FIG. 3 illustrates a procedure of a process of addressing misfire. The process illustrated in FIG. 3 is implemented in a manner such that the CPU 72 executes an addressing program 74b stored in the ROM 74 illustrated in FIG. 1 when the failure flag F is switched from "0" to "1".

In a series of processes illustrated in FIG. 3, the CPU 72 first operates the intake valve timing changing device 40 by outputting the operation signal MS6 to the intake valve timing changing device 40 to advance an opening timing DIN of each intake valve 16 (S50). Specifically, in a normal state in which the failure flag F is "0", the CPU 72 variably sets the opening timing DIN depending on an operating point of the internal combustion engine 10. In the process of S50, the CPU 72 advances the actual opening timing DIN relative to the opening timing DIN in the normal state. The process of S50 is intended to stabilize combustion by increasing a compression ratio.

After the process of S50 is continued for the predetermined period or longer, the CPU 72 determines whether the failure flag F is "1" (S52). This process is intended to determine whether the situation that causes the misfire is terminated through the process of S50. When the CPU 72 determines that the failure flag F is "1" (S52: YES), the CPU 72 operates the ignition device 22 of the misfiring cylinder #q by outputting the operation signal MS3 to the ignition device 22 to advance an ignition timing aig by a predetermined amount Δ (S54). This process is intended to terminate the situation that causes the misfire.

After the process of S54 is continued for the predetermined period or longer, the CPU 72 determines whether the failure flag F is "1" (S56). This process is intended to determine whether the situation that causes the misfire is terminated through the process of S54. When the CPU 72 determines that the failure flag F is "1" (S56: YES), the CPU 72 operates the fuel injection valve 20 of the misfiring cylinder #q by outputting the operation signal. MS2 to the fuel injection valve 20 such that the fuel injection valve 20 increases a required injection amount Qd by a predetermined amount (S58). The required injection amount Qd is an amount of fuel required in one combustion cycle. This process is intended to terminate the situation that causes the misfire.

After the process of S58 is continued for the predetermined period or longer, the CPU 72 determines whether the failure flag F is "1" (S60). This process is intended to determine whether the situation that causes the misfire is terminated through the process of S58. When the CPU 72 determines that the failure flag F is "1" (S60: YES), the CPU 72 stops the fuel injection to the misfiring cylinder #q. Further, the CPU 72 adjusts the operation signal MS1 to be output to the throttle valve 14 to operate the throttle valve 14 while limiting an opening degree θ of the throttle valve 14 to a small degree (S62). The CPU 72 operates an alarm lamp 90 illustrated in FIG. 1 to execute a process of providing a notification that the misfire occurs (S64).

When the determination result in the process of S52, S56, or S60 is negative, that is, when the situation that causes the misfire is terminated, or when the process of S64 is completed, the CPU 72 temporarily terminates the series of processes illustrated in FIG. 3. When the determination result in the process of S60 is positive, the process of S62 is continued as a fail-safe process.

Next, a method for generating the mapping data 76a is described.

Figure 4:
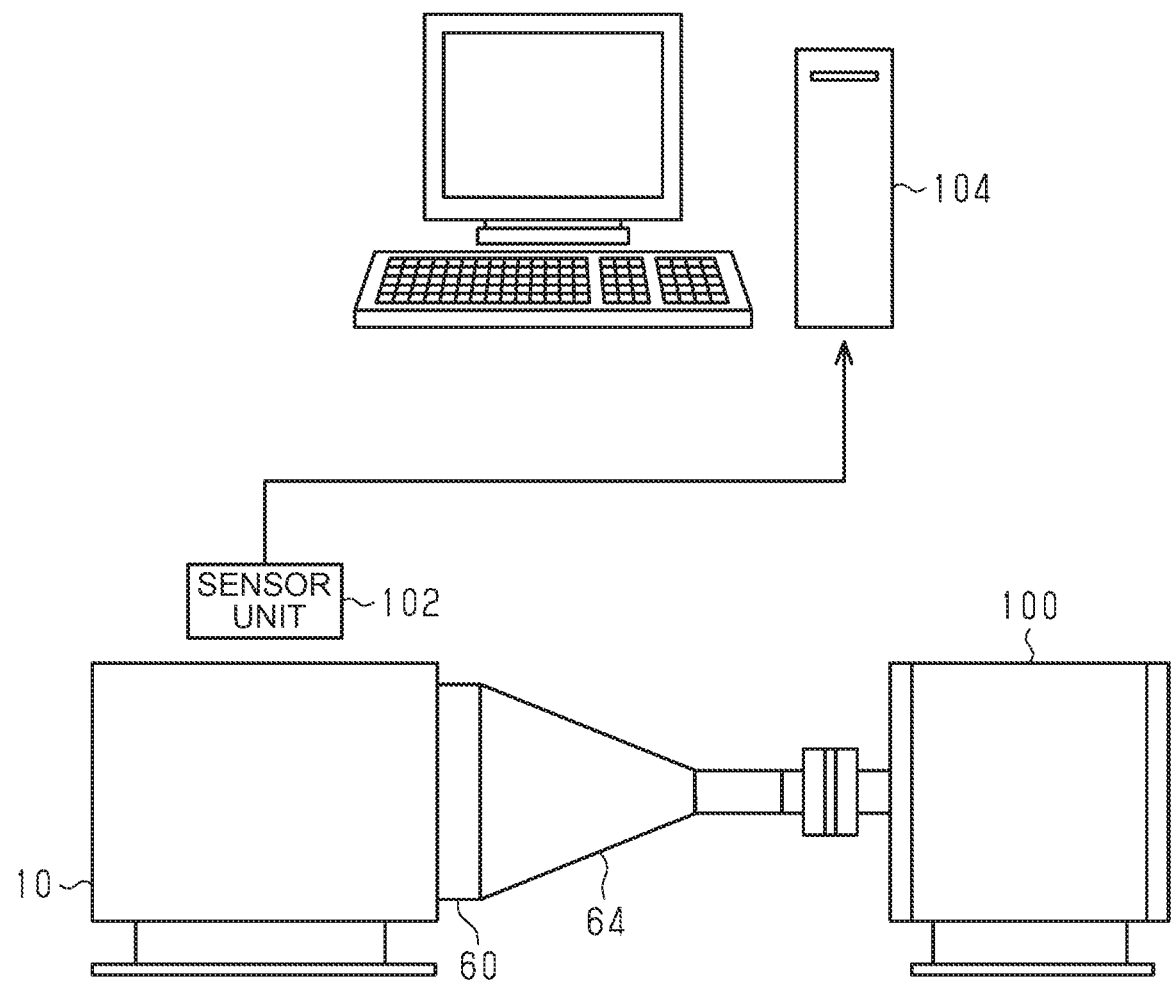
FIG. 4 is a diagram illustrating a system configured to generate mapping data according to the first embodiment.

FIG. 4 illustrates a system configured to generate the mapping data 76a.

As illustrated in FIG. 4, in this embodiment, the internal combustion engine 10 is mechanically coupled to a dynamometer 100 via the torque converter 60 and the transmission 64. A sensor unit 102 detects various state variables when the internal combustion engine 10 is operated. Detection results are input to an adaptation device 104, which is a computer configured to generate the mapping data 76a. The sensor unit 102 includes the crank angle sensor 80 and the airflow meter 82 configured to detect values for generating inputs to the mapping. The sensor unit 102 further includes, for example, cylinder pressure sensors to securely grasp whether misfire occurs. The sensor for securely grasping whether misfire occurs is hereinafter referred to also as a misfire sensor.

Figure 5:
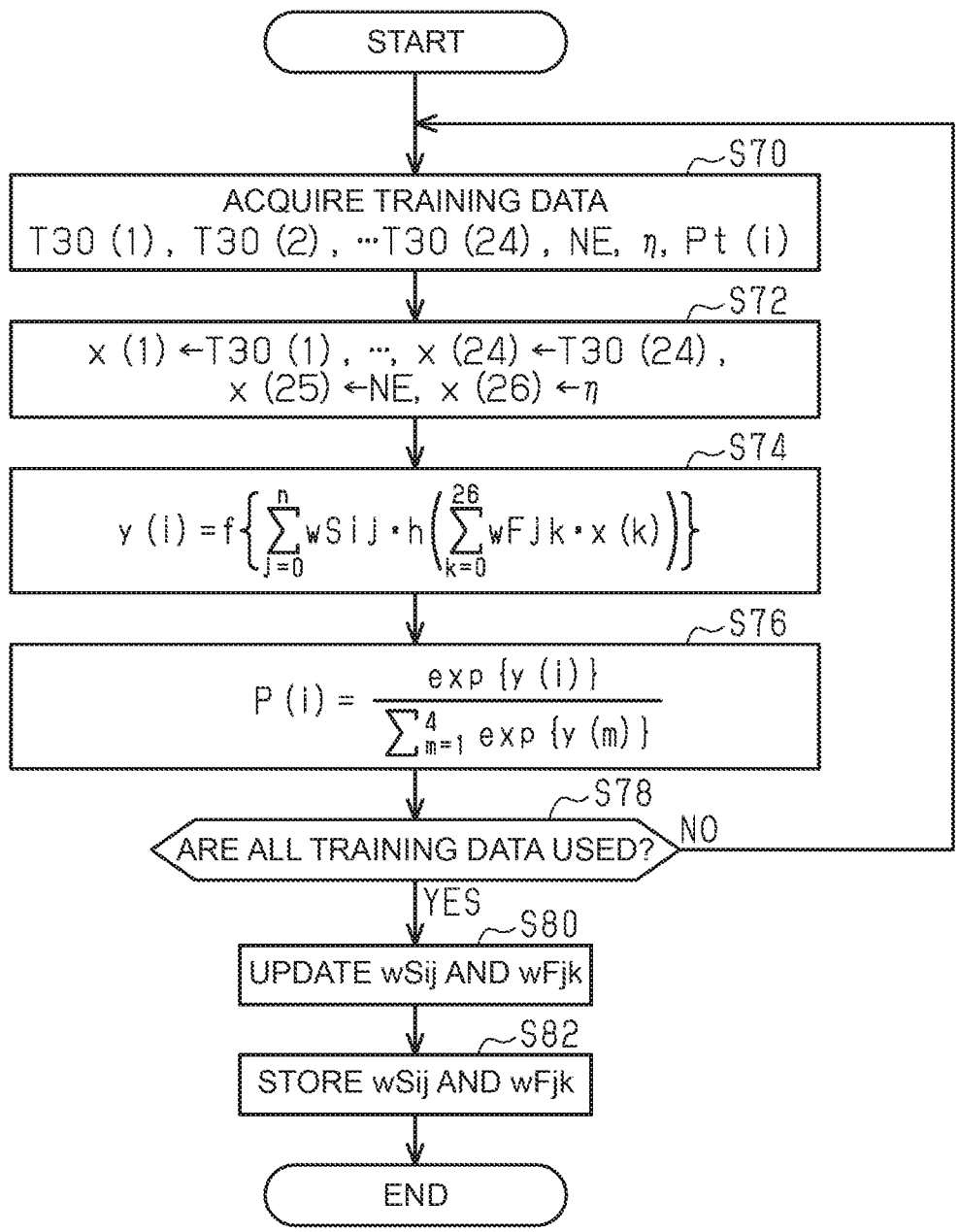
FIG. 5 is a flowchart illustrating a procedure of a mapping data learning process according to the first embodiment.

FIG. 5 illustrates a procedure of a mapping data generation process. The process illustrated in FIG. 5 is executed by the adaptation device 104. For example, the process illustrated in FIG. 5 may be implemented in a manner such that the adaptation device 104 includes a CPU and a ROM and the CPU executes a program stored in the ROM.

In a series of processes illustrated in FIG. 5, the adaptation device 104 first acquires a plurality of sets of the infinitesimal rotation times T30(1) to T30(24), the rotation speed NE, the charging efficiency η, and a true probability Pt(i) of misfire as training data (S70). The training data is determined based on the detection results from the sensor unit 102. The true probability Pt(i) is "1" when misfire occurs, and is "0" when misfire does not occur. The true probability Pt(i) is calculated based on, for example, detection values from the misfire sensors in the sensor unit 102 (for example, the cylinder pressure sensors). The detection values from the misfire sensors are parameters other than the parameters that define the input variables x(1) to x(26). To generate the training data, for example, the fuel injection to a predetermined cylinder may be stopped intentionally to cause a phenomenon similar to the phenomenon that misfire occurs. In this case as well, the cylinder pressure sensor or the like is used as the misfire sensor to detect whether misfire occurs in the cylinder to which fuel is injected.

Next, the adaptation device 104 substitutes, in a manner that is just like the process of S14, data other than the true probability Pt(i) in the training data into the input variables x(1) to x(26) of the mapping for calculating the probability of misfire (S72). Next, the adaptation device 104 calculates the probability model y(i) by substituting the input variables x(1) to x(26) into the neural network in a manner that is just like the process of S16 (S74). Next, the adaptation device 104 calculates the probabilities P(1) to P(4) of misfire in the cylinders #1 to #4 by inputting the probability model y(i) to the softmax function in a manner that is just like the process of S24 (S76). The adaptation device 104 determines whether the processes of S70 to S76 are executed for all the training data detected by the sensor unit 102 (S78). When the adaptation device 104 determines that any training data has not undergone the processes of S70 to S76 (S78: NO), the adaptation device 104 proceeds to the process of S70, and executes the processes of S70 to S76 for the training data that has not undergone those processes.

When the adaptation device 104 determines that the processes of S70 to S76 are executed for all the training data detected by the sensor unit 102 (S78: YES), the adaptation device 104 updates the input-side coefficient wFjk and the output-side coefficient wSij to minimize cross entropy between the probability P(i) calculated through the process of S76 and the true probability Pt(i) (S80). The adaptation device 104 stores the updated input-side coefficient wFjk, the updated output-side coefficient wSij, and the like as trained mapping data (S82).

When the process of S82 is completed, the adaptation device 104 verifies the accuracy of the probability P(i) calculated by using the mapping defined by the input-side coefficient wFjk, the output-side coefficient wSij, and the like stored through the process of S82. When the accuracy falls out of a permissible range, the adaptation device 104 newly generates training data by operating the internal combustion engine 10, and repeats the processes of S70 to S82. When the accuracy falls within the permissible range, the adaptation device 104 sets the input-side coefficient wFjk, the output-side coefficient wSij, and the like as the mapping data 76a to be included in the control apparatus 70A.

Actions and effects of the first embodiment are described.

Figure 6:
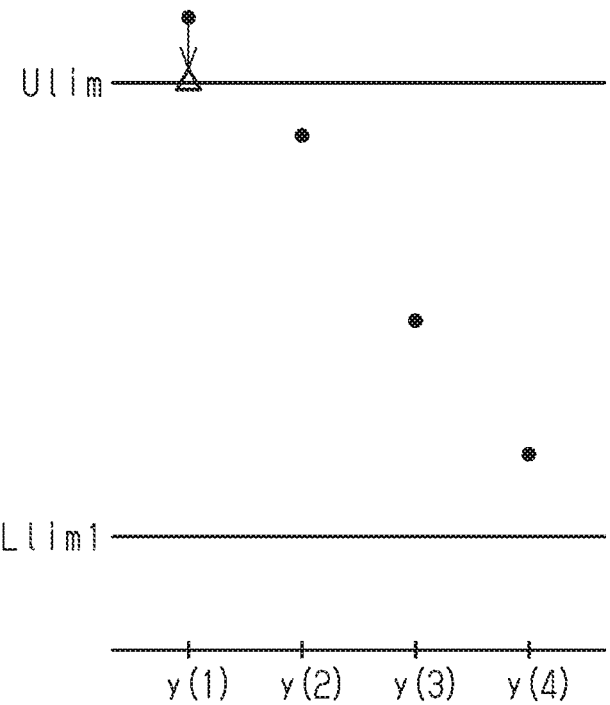
FIG. 6 is an explanatory drawing for describing the processes of the first embodiment.

(1) As illustrated in FIG. 6, it is assumed that a process of setting the maximum value ymax to agree with the upper limit value Ulim of the permissible range is executed in place of the process of S20 when the maximum value ymax is larger than the upper limit value Ulim. In this case, for example, the probability model y(1) having the maximum value ymax agrees with the upper limit value Ulim. The probability models y(2) to y(4) equal to or smaller than the upper limit value Ulim are the probability models y(2) to y(4) calculated through the process of S16. Therefore, a difference between the magnitudes of, for example, the probability model y(1) having the maximum value ymax and the probability model y(2) having the second largest value decreases. Thus, the probability P(i) obtained when the probability model y(i) is input to the softmax function through the process of S24 is excessively influenced by the probability model y(2) having the second largest value. As a result, the magnitude relationship of the probability models y(i) output from the neural network is not reflected appropriately. Thus, the magnitude relationship of the probability models y(i) may be calculated as being extremely narrow.

Figure 7:
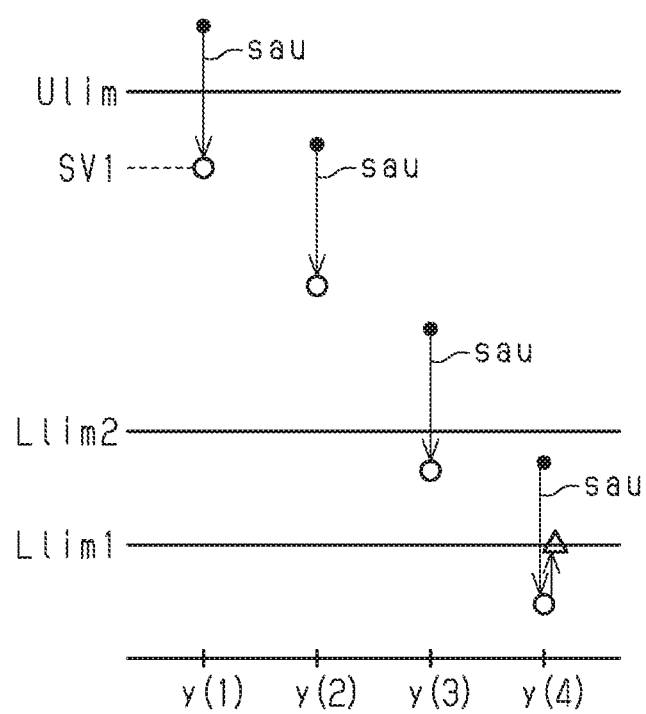
FIG. 7 is an explanatory drawing for describing the processes of the first embodiment.

As illustrated in FIG. 7, according to the first embodiment, all the probability models y(1) to y(4) output from the neural network are reduced by the amounts corresponding to the difference sau between the maximum value ymax and the first reference value SV1 through the process of S20. In the example illustrated in FIG. 7, the magnitude relationship of the probability models y(i) does not change, and the differences among the probability models y(1) to y(3) do not change. Thus, the probability P(i) to be obtained when the probability model y(i) is input to the softmax function through the process of S24 is calculated while keeping the magnitude relationship of the probability models y(i) output from the neural network. As a result, the probability P(i) can be calculated while the magnitude relationship of the probability models y(i) output from the neural network is reflected appropriately.

(2) According to the first embodiment, when the maximum value ymax is smaller than the second lower limit value Llim2 of the permissible range, all the probability models y(i) including the maximum value ymax are increased by the amounts corresponding to the difference sal between the second reference value SV2 and the maximum value ymax. Therefore, the magnitude relationship between the probability model y(1) and the other probability models y(i) does not change. Thus, the probability P(i) to be obtained when the probability model y(i) is input to the softmax function through the process of S24 is calculated while keeping the magnitude relationship of the probability models y(i) output from the neural network. As a result, the probability P(i) can be calculated while the magnitude relationship of the probability models y(i) output from the neural network is reflected appropriately even though the maximum value ymax is smaller than the second lower limit value Llim2 of the permissible range.

Figure 8:
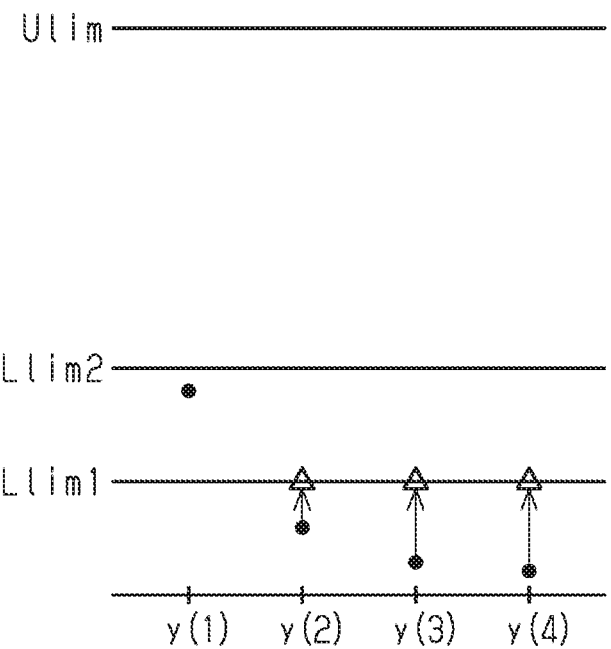
FIG. 8 is an explanatory drawing for describing the processes of the first embodiment.

(3) As illustrated in FIG. 8, it is assumed that the process of S30 is not executed when the maximum value ymax is equal to or larger than the first lower limit value Llim1 of the permissible range but is smaller than the second lower limit value Llim2 of the permissible range. In this case, it is assumed that, for example, the probability models y(2) to y(4) other than the probability model y(1) having the maximum value ymax are smaller than the first lower limit value Llim1 of the permissible range. In this case, the probability models y(2) to y(4) agree with the first lower limit value Llim1 through the process of S26. Therefore, differences between the magnitudes of the probability model (1) and the probability models y(2) to y(4) decrease. Thus, the probability P(1) obtained when the probability model y(1) is input to the softmax function through the process of S24 is excessively influenced by the probability models y(2) to y(4). As a result, the magnitude relationship of the probability models y(i) output from the neural network is not reflected appropriately. Thus, the magnitude relationship of the probability models y(i) may be calculated as being extremely narrow.

Figure 9:
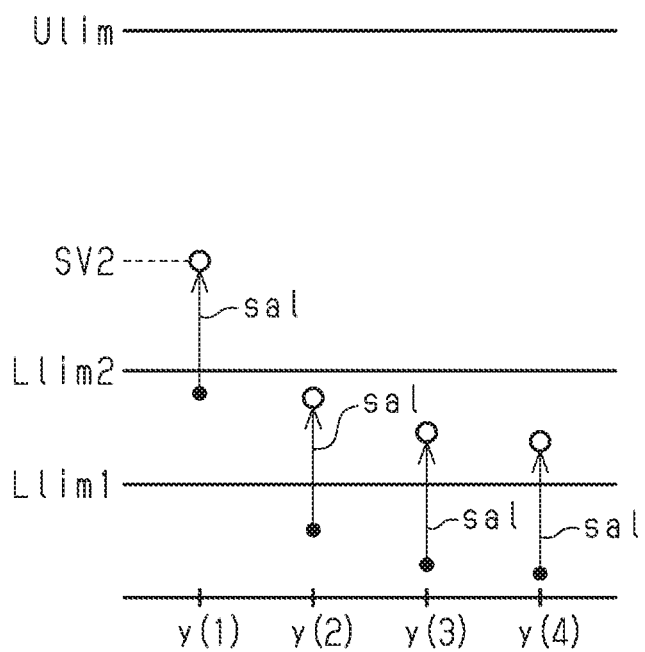
FIG. 9 is an explanatory drawing for describing the processes of the first embodiment.

As illustrated in FIG. 9, according to the first embodiment, when the maximum value ymax is equal to or larger than the first lower limit value Llim1 of the permissible range but is smaller than the second lower limit value Llim2, all the probability models y(i) including the maximum value ymax are increased by the amounts corresponding to the difference sal between the second reference value SV2 and the maximum value ymax. Therefore, there is a strong possibility that the magnitude relationship between the maximum value ymax and the other probability models y(i) is kept even if the process of S26 is executed.

(4) According to the first embodiment, new probability models y(i) are obtained by reducing all the probability models y(i) by the amounts corresponding to the difference sau in the process of S20. That is, uniform amounts are subtracted from all the probability models y(i), and therefore the magnitude relationship can be prevented from changing through the process of S20. In this respect, a similar effect can be attained in the process of S30, in which all the probability models y(i) are increased by the amounts corresponding to the difference sal.

(5) According to the first embodiment, in the process of S20, the maximum value ymax is equal to the first reference value SV1 that falls within the permissible range and is equal to or larger than the second lower limit value Llim2. In the process of S30, the maximum value ymax is equal to the second reference value SV2 that falls within the permissible range and is equal to or larger than the second lower limit value Llim2. When the process of S20 or S30 is executed and then the process of S26 is executed such that the other probability models y(i) agree with the first lower limit value Llim1, the maximum value ymax is larger than the first lower limit value Llim1 to some extent. Thus, an excessive decrease in at least differences between the magnitudes of the maximum value among the probability models y(i) and the probability models y(i) that agree with the first lower limit value Llim1 is suppressed.

(6) According to the first embodiment, the probability model y(i) smaller than the first lower limit value Llim1 of the permissible range agrees with the first lower limit value Llim1 through the process of S26. Therefore, all the probability models y(i) can fall within the permissible range even if the difference from the magnitude of the maximum value ymax is excessively large.

(7) According to the first embodiment, all the probability models y(i) are set within the permissible range to determine whether the internal combustion engine 10 is misfiring. Particularly when determination is made about the condition of the internal combustion engine 10 as typified by whether misfire occurs, the CPU 72 may be reset if a value outside the permissible range is input to the softmax function during control for the internal combustion engine 10 based on a result of the determination. Appropriate fuel injection cannot be made during a period in which the CPU 72 is reset. As a result, there is a possibility that a torque cannot be generated. Therefore, the probability models y(i) are set within the permissible range while keeping an appropriate magnitude relationship. This configuration reduces the possibility that the magnitude relationship of the probability models y(i) is calculated as being extremely narrow, and attains an effect that malfunctions to be caused by the reset of the CPU 72 are suppressed.

Second Embodiment

Figure 10:
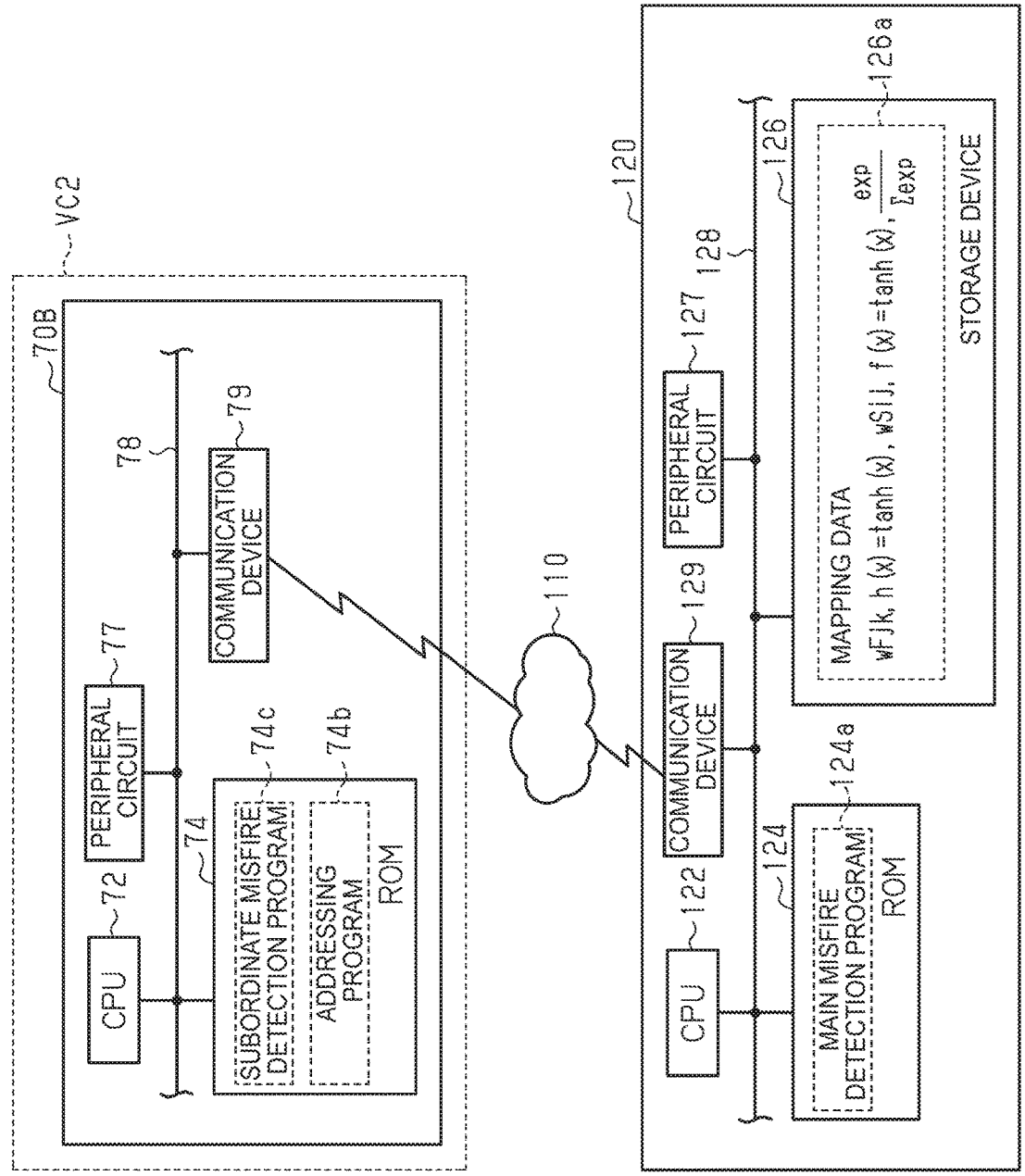
FIG. 10 is a diagram illustrating the configuration of an internal combustion engine condition determination system according to a second embodiment.

FIG. 10 illustrates an internal combustion engine condition determination system according to a second embodiment. In FIG. 10, members corresponding to the members illustrated in FIG. 1 are represented by the same reference symbols for convenience.

A control apparatus 70B in a vehicle VC2 illustrated in FIG. 10 includes a communication device 79. The communication device 79 communicates with a center 120 via a network 110 outside the vehicle VC2.

The center 120 analyzes data transmitted from a plurality of vehicles VC2. The center 120 includes a CPU 122, a ROM 124, a memory 126, a peripheral circuit 127, and a communication device 129, which are communicable with each other via a local network 128. The ROM 124 stores a main misfire detection program 124a. The memory 126 stores mapping data 126a. The mapping data 126a is identical to the mapping data 76a.

Figure 11:
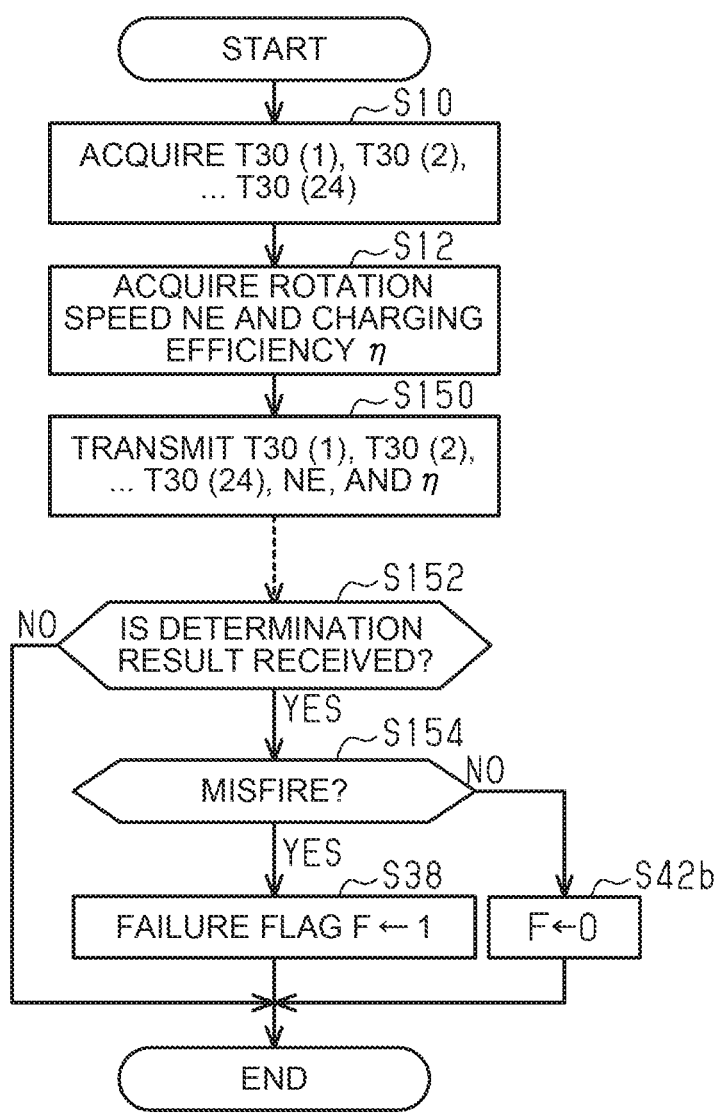
FIG. 11 is a flowchart illustrating a procedure of a process to be executed by the internal combustion engine condition determination system according to the second embodiment.
Figure 12:
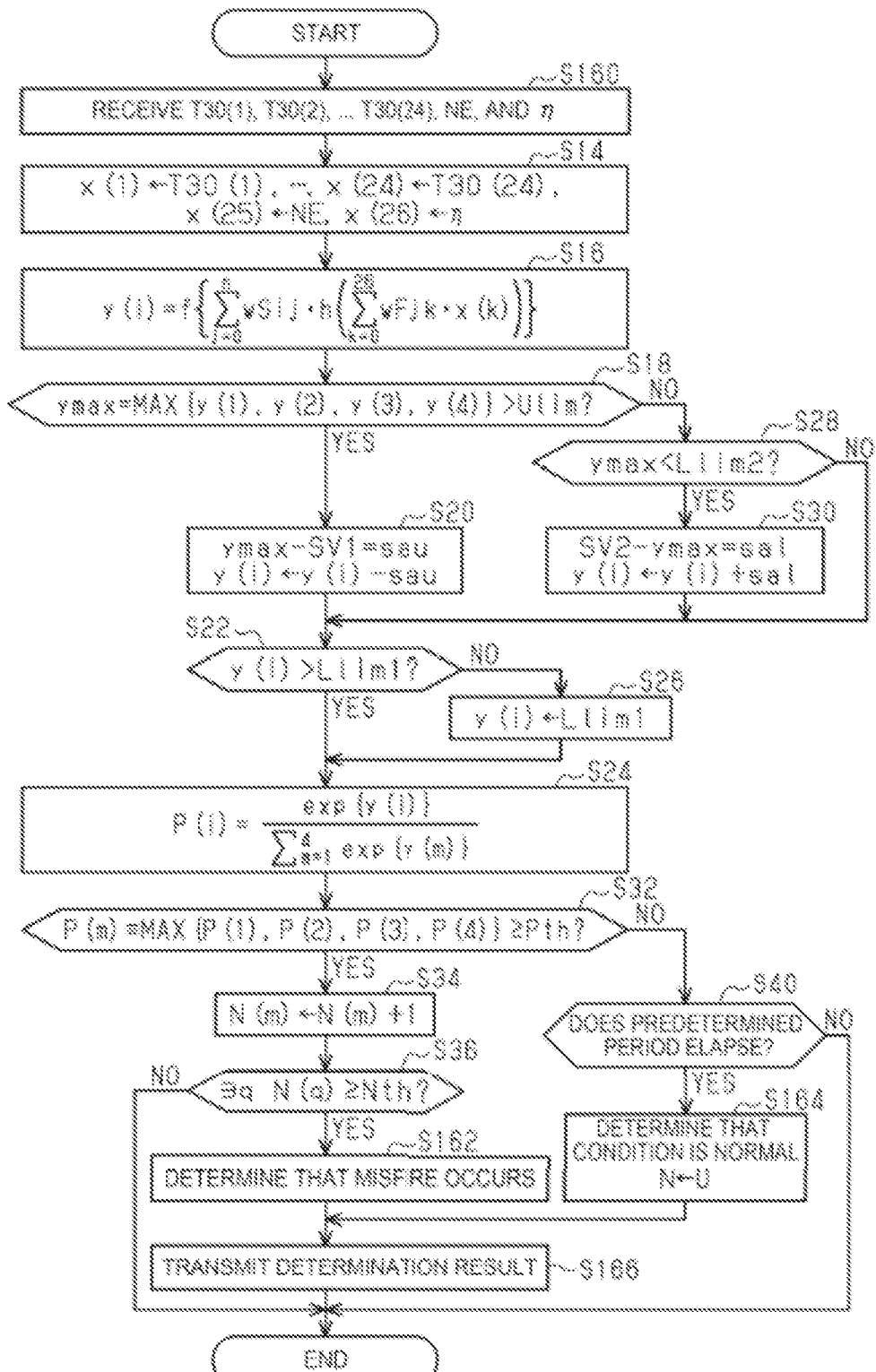
FIG. 12 is a flowchart illustrating a procedure of the process to be executed by the internal combustion engine condition determination system according to the second embodiment.

FIG. 11 and FIG. 12 illustrate procedures of an internal combustion engine condition determination process according to this embodiment. The process illustrated in FIG. 11 is implemented in a manner such that the CPU 72 executes a subordinate misfire detection program 74c stored in the ROM 74 illustrated in FIG. 10. The process illustrated in FIG. 12 is implemented in a manner such that the CPU 122 executes the main misfire detection program 124a stored in the ROM 124. In FIG. 11 and FIG. 12, processes corresponding to the processes illustrated in FIG. 2 are represented by the same step numbers for convenience. The processes illustrated in FIG. 11 and FIG. 12 are described below along the time sequence of the misfire detection process.

When the CPU 72 in the vehicle VC2 executes the processes of S10 and S12 illustrated in FIG. 11, the CPU 72 operates the communication device 79 to transmit data acquired through the processes of S10 and S12 to the center 120 together with identification information of the vehicle VC2 (S150).

As illustrated in FIG. 12, the CPU 122 of the center 120 receives the transmitted data (S160), and repeats the processes of S14 to S34 using the received data. When the CPU 122 determines that the count of misfire in a specific cylinder is equal to or larger than the count Nth within a predetermined period in the same vehicle identified based on the identification information by repeating the processes of S14 to S34 (S36: YES), the CPU 122 determines that misfire occurs (S162). When the count of misfire in the specific cylinder is smaller than the count Nth though the processes of S14 to S34 are repeated over the predetermined period (S40: YES), the CPU 122 determines that the condition is normal, and initializes the counts N(1) to N(4) (S164). The predetermined period is set based on the timing of the process of S162 or S164.

When the process of S162 or S164 is completed, the CPU 122 operates the communication device 129 based on the identification information to transmit a signal indicating a determination result to the vehicle VC2 that transmits the data for the processes of S14 to S34 (S166). When the determination result shows that misfire occurs, the information related to the determination result includes information related to the misfiring cylinder. When the process of S166 is completed or when the determination result in the process of S36 or S40 is negative, the CPU 122 temporarily terminates the series of processes illustrated in FIG. 12.

As illustrated in FIG. 11, when the CPU 72 in the vehicle VC2 receives the signal indicating the determination result from the center 120 (S152: YES), the CPU 72 determines whether the determination result shows that misfire occurs (S154). When the determination result shows that misfire occurs (S154: YES), the CPU 72 proceeds to the process of S38. When the determination result shows that misfire does not occur (S154: NO), the CPU 72 initializes the failure flag F (S42b).

When the process of S38 or S42b is completed or when the determination result in the process of S152 is negative, the CPU 72 temporarily terminates the process illustrated in FIG. 11. In this embodiment, the calculation load on the control apparatus 70B can be reduced by executing the misfire determination process in the center 120.

Description of Exemplification

The control apparatus 70A is an example of an internal combustion engine condition determination apparatus. The CPU 72 and the ROM 74 are examples of a processor. The memory 76 is an example of a memory. The infinitesimal rotation time T30, the rotation speed NE, and the charging efficiency η are examples of an internal combustion engine state variable. The processes of S10 and S12 are examples of an acquisition process. The processes of S14 and S16 are examples of an input process. The processes of S18 and S20 are examples of a guard process. The process of S24 is an example of a normalization process. The processes of S32 to S42 are examples of a determination process. The probability models y(1) to y(4) are examples of a plurality of output values. The first reference value SV1 is an example of a value within a permissible range. The first reference value SV1 is an example of a value that falls within the permissible range and is equal to or larger than a second lower limit value larger than a lower limit value by a predetermined amount. The processes of S28 and S30 are other examples of the guard process. The second reference value SV2 is another example of the value within the permissible range. The second reference value SV2 is an example of a value that is equal to or smaller than an upper limit value of the permissible range and equal to or larger than the second lower limit value. The difference sau and the difference sal are examples of a difference. The processes of S22 and S24 are examples of a lower limit process. The angle of 720 degrees CA is an example of a first interval. The angle of 30 degrees CA is an example of a second interval. The infinitesimal rotation time T30 is an example of an instantaneous speed parameter. The CPU 72 and the ROM 74 are examples of a first processor. The CPU 122 and the ROM 124 are examples of a second processor. The process of S150 is an example of a vehicle-side transmission process. The process of S160 is an example of an external reception process. The process of S166 is an example of an external transmission process. The center 120 illustrated in FIG. 10 is an example of a data analyzing apparatus. The control apparatus 70B illustrated in FIG. 10 is another example of an internal combustion engine control apparatus.

Other Embodiments

The embodiments may be modified as follows. The embodiments and the following modified examples may be combined without causing any technical contradiction.

Internal Combustion Engine State Variable

In the embodiments described above, the internal combustion engine state variable to be input to the neural network of the mapping is not limited to the examples in the embodiments. The internal combustion engine state variable is not particularly limited as long as the internal combustion engine state variable is a parameter indicating the condition of the internal combustion engine 10. For example, the internal combustion engine state variable may be a torque change value or a difference among the infinitesimal rotation times T30 in the cylinders.

Determination Target Condition of Internal Combustion Engine

In the embodiments described above, the condition of the internal combustion engine 10 that is the target of the determination by the CPU 72 is not limited to the examples in the embodiments. For example, determination may be made about an abnormality of leakage of blowby gas through a blowby gas passage in the internal combustion engine 10.

Guard Process

In the embodiments described above, the CPU 72 executes the process of S20 when the maximum value ymax is larger than the upper limit value Ulim of the permissible range (S18: YES), and executes the process of S24 when the maximum value ymax is smaller than the first lower limit value Llim1 of the permissible range (S22: YES). However, S20 or S24 may be omitted as the guard process. Even if the process of S20 or S24 is executed alone, an effect is attained when the maximum value ymax is larger than the upper limit value Ulim or when the maximum value ymax is smaller than the first lower limit value Llim1.

In the embodiments described above, the CPU 72 need not execute the process of S30 when the maximum value ymax is smaller than the second lower limit value Llim2 and larger than the first lower limit value Llim1. In this case as well, the maximum value ymax is larger than the first lower limit value Llim1. Therefore, it is possible to prevent the occurrence of a case where all the probability models y(1) to y(4) have the same value through the process of S26.

In the embodiments described above, the CPU 72 sets the maximum value ymax to be equal to the first reference value SV1 in the process of S20. It is appropriate that the first reference value SV1 fall within the permissible range. The first reference value SV1 need not be equal to or larger than the second lower limit value Llim2. In this case as well, the maximum value ymax is larger than the first lower limit value Llim1. Therefore, it is possible to prevent the occurrence of the case where all the probability models y(1) to y(4) have the same value through the process of S26. The same applies to the second reference value SV2 in the process of S30.

In the embodiments described above, the difference sau between the maximum value ymax and the first reference value SV1 is subtracted from all the probability models y(i) in the process of S20. The process of S20 is not limited to the subtraction. For example, in the process of S20, the maximum value ymax may be set within the permissible range and the other probability models y(i) may be reduced by multiplying all the probability models y(i) by a value obtained by dividing the upper limit value Ulim by the maximum value ymax such that the maximum value ymax is equal to the upper limit value Ulim. In the process of S30 as well, all the probability models y(i) may be increased at a given rate without adding the difference sal to all the probability models y(i).

In the embodiments described above, the magnitude relationship between the first reference value SV1 and the second reference value SV2 is not particularly limited. For example, the first reference value SV1 may be equal to the second reference value SV2. When the maximum value ymax falls out of the permissible range in this case, a process is executed such that the maximum value ymax is changed to the same value irrespective of whether the maximum value ymax is larger than the upper limit value Ulim or is smaller than the first lower limit value Llim1.

First Interval and Second Interval

In the embodiments described above, the infinitesimal rotation time T30 serving as the instantaneous speed parameter in each of the plurality of successive second intervals within the rotation angle interval of 720 degrees CA corresponding to one combustion cycle is set as the parameter to be input to the mapping for the determination of whether misfire occurs. That is, description is given of the example in which the first interval is 720 degrees CA and the second interval is 30 degrees CA. The first interval and the second interval are not limited to those in this example. For example, the first interval may be a rotation angle interval larger than 720 degrees CA. Further, the first interval need not essentially be equal to or larger than 720 degrees CA. The first interval may be equal to or smaller than 720 degrees CA, such as 480 degrees CA, for an input to mapping that outputs data related to a probability of misfire or a generated torque in a specific cylinder. At this time, the first interval may be a rotation angle interval larger than the existence interval of the compression top dead center. The first interval includes a compression top dead center of a cylinder to be subjected to the determination of the probability of misfire.

The second interval is not limited to 30 degrees CA. The second interval may be an angle interval smaller than 30 degrees CA, such as 10 degrees CA. The second interval is not limited to the angle interval equal to or smaller than 30 degrees CA, but may be, for example, 45 degrees CA.

Instantaneous Speed Parameter

The instantaneous speed parameter is not limited to the infinitesimal rotation time, which is required for rotation in the second interval. For example, the instantaneous speed parameter may be a value obtained by dividing the second interval by the infinitesimal rotation time. The instantaneous speed parameter need not essentially be obtained through the normalization process in which the difference between the maximum value and the minimum value is a fixed value. The filtering serving as the pre-process for obtaining the input to the mapping is not limited to the filtering described above.

For example, the process may involve eliminating influence of rotation of the crankshaft 24 by the input shaft 66 of the transmission 64 based on infinitesimal rotation times of the input shaft 66. The instantaneous speed parameter to be input to the mapping need not essentially be subjected to the filtering.

Parameters for Defining Operating Point of Internal Combustion Engine

In the embodiments described above, the rotation speed NE and the charging efficiency η define the operating point, but the parameters are not limited to the rotation speed NE and the charging efficiency η. For example, the parameters may be the rotation speed NE and the intake amount Ga. For example, an injection amount or a required torque of the internal combustion engine may be used as a load in place of the charging efficiency η. The use of the injection amount or the required torque as the load is particularly effective in a compression-ignition internal combustion engine.

Inputs to Mapping

The inputs to the mapping together with the instantaneous speed parameter are not limited to the examples in the embodiments and the modified examples. Examples of the inputs may include a parameter related to an environment around the internal combustion engine 10. Specific examples may include an atmospheric pressure, which is a parameter that influences the ratio of oxygen in intake air. Examples may also include an intake air temperature, which is a parameter that influences the combustion rate of the air-fuel mixture in the combustion chamber 18. Examples may also include a humidity, which is a parameter that influences the combustion rate of the air-fuel mixture in the combustion chamber 18. The humidity may be grasped by using a humidity sensor, or by using the condition of a wiper or a detection value from a sensor configured to detect raindrop. Examples may also include data related to the condition of an auxiliary device mechanically coupled to the crankshaft 24.

The inputs to the mapping need not essentially include the operating point of the internal combustion engine 10. For example, the inputs need not include the operating point when the internal combustion engine is mounted on a series hybrid vehicle as described in an "Internal Combustion Engine" section and control is performed under the assumption that the operating point is limited to a narrow range.

The input to the mapping together with the instantaneous speed parameter may be only one out of two parameters such as the load and the rotation speed NE for defining the operating point, or the intake amount and the rotation speed NE.

Mapping

The activation function h(x) in the intermediate layer need not essentially be the same function in all dimensions.

The neural network constituting the mapping that outputs the probability of misfire is not limited to the neural network having one intermediate layer. For example, the neural network may have two or more intermediate layers. Use of the neural network having many intermediate layers in the system illustrated in FIG. 11 and FIG. 12 is particularly effective in reducing the calculation load on the control apparatus 70B.

For example, several main components of the physical quantities described above may be input to the neural network instead of using the individual physical quantities. In this case, the main components include a linear combination of the infinitesimal rotation times T30(1) to T30(24). Therefore, it may be understood that an output of linear mapping to which the infinitesimal rotation times T30(1) to T30(24) are input is input to the neural network.

Determination Process

The determination process is not limited to the process directly using the output of the mapping that is the probability of misfire. For example, the rotation speed NE may be excluded from the inputs to the mapping in the process of FIG. 2, and the probability of misfire to be output may be corrected by the rotation speed NE instead. Specifically, the mapping data may be generated by using training data at a specific rotation speed NE, and the probability of misfire to be output from the mapping may be increased when the actual rotation speed NE deviates from the specific rotation speed NE. This method is one method for setting a margin in view of a decrease in the accuracy of the probability due to the deviation from the rotation speed NE used for the training data as a precondition.

The method is not limited to the correction using the rotation speed NE. For example, an adjustment variable, which is a parameter for adjusting the combustion rate of the air-fuel mixture, may be set as a parameter for calculating a correction amount for correcting the probability to be output from the mapping, instead of being input to the mapping together with the instantaneous speed parameter. For example, a drive-system device state variable, which is a parameter indicating the condition of a drive-system device, may be set as the parameter for calculating the correction amount for correcting the probability to be output from the mapping, instead of being input to the mapping together with the instantaneous speed parameter. For example, a state variable of a road may be set as the parameter for calculating the correction amount for correcting the probability to be output from the mapping, instead of being input to the mapping together with the instantaneous speed parameter. For example, the parameters exemplified in the "Inputs to Mapping" section and the "Parameters for Defining Operating Point of Internal Combustion Engine" section may be set as the parameter for calculating the correction amount for correcting the probability to be output from the mapping, instead of being input to the mapping together with the instantaneous speed parameter.

Operation Process

In the embodiments described above, the process of S54 is executed as an operation process when misfire does not cease though the process of S50 is executed after the failure flag F turns into "1", and the process of S58 is executed as the operation process when the misfire does not cease though the process of S54 is executed. The operation process is not limited to the processes to be executed in this order to cease the misfire. For example, the processes may be executed in order of S54, S58, and S50, in order of S58, S54, and S50, or in order of S58, S50, and S54.

The fail-safe process to be executed when the failure flag F is "1" is not limited to the processes of S50, S54, S58, and S62. For example, one, two, or three out of the four processes may be executed.

Generation of Mapping Data

In the embodiments described above, the training data is the data obtained when the internal combustion engine 10 is operated in a state in which the dynamometer 100 is connected to the crankshaft 24 via the torque converter 60 and the transmission 64, but the training data is not limited to such data. For example, the training data may be data obtained when the internal combustion engine 10 is operated while being mounted on the vehicle VC1 or VC2.

Internal Combustion Engine Condition Determination System

For example, the probabilities P(1) to P(4) calculated through the process of S24 in the center 120 may be transmitted to the vehicle VC2, and the processes of S32 to S38 may be executed based on the probabilities P(1) to P(4) in the vehicle VC2.

The internal combustion engine condition determination system is not limited to the system including the control apparatus 70B in the vehicle VC2 and the center 120 outside the vehicle VC2. For example, the internal combustion engine condition determination system may include a user's mobile terminal in addition to the control apparatus 70B as a transmission destination to which the center 120 transmits a misfire determination result. In this case, the notification process exemplified as the process of S64 in FIG. 3 may be executed by the mobile terminal, and the fail-safe process exemplified as the processes of S50, S54, S58, and S62 may be executed by the control apparatus 70B. For example, this process can be implemented by installing, in the mobile terminal, an application program for receiving a signal from the center 120 and displaying the determination result.

The process exemplified in FIG. 12 may be executed by a mobile terminal of a user of the vehicle VC2 instead of being executed by the center 120 configured to analyze big data. This process can be implemented by installing, in the mobile terminal, an application program for causing the computer to execute the process exemplified in FIG. 12.

Processor

The processor is not limited to the device that includes the CPU 72 (122) and the ROM 74 (124) and executes the software process. For example, the processor may include a dedicated hardware circuit (for example, an application-specific integrated circuit (ASIC)) configured to execute a hardware process in place of at least a part of the software process in the embodiments. That is, the processor may have one of the following structures (a) to (c). (a) The processor includes a processing device configured to execute all the processes described above based on programs, and a program memory such as a ROM that stores the programs. (b) The processor includes a processing device configured to execute a part of the processes described above based on programs, a program memory, and a dedicated hardware circuit configured to execute the remaining processes. (c) The processor includes a dedicated hardware circuit configured to execute all the processes described above. A plurality of devices or circuits may be provided as the software processor including the processing device and the program memory or as the dedicated hardware circuit.

Memory

In the embodiments described above, the memory that stores the mapping data 76a or 126a differs from the memory that stores the misfire detection program 74a or the main misfire detection program 124a (ROM 74, 124). The memory is not limited to those memorys.

Internal Combustion Engine

In the embodiments described above, a direct injection valve configured to inject fuel into the combustion chamber 18 is exemplified as the fuel injection valve, but the fuel injection valve is not limited to the direct injection valve. For example, the fuel injection valve may be a port injection valve configured to inject fuel into the intake passage 12. For example, both the port injection valve and the direct injection valve may be provided.

The internal combustion engine is not limited to a spark-ignition internal combustion engine. For example, the internal combustion engine may be a compression-ignition internal combustion engine using light oil as the fuel. The internal combustion engine need not essentially constitute the drive system. For example, the internal combustion engine may be mounted on a so-called series hybrid vehicle, in which the crankshaft is mechanically coupled to an on-board generator and power transmission to the driving wheels 69 is interrupted.

Vehicle

The vehicle is not limited to a vehicle using only an internal combustion engine as a device configured to generate a propulsive force of the vehicle. For example, the vehicle may be a parallel hybrid vehicle or a series-parallel hybrid vehicle as well as the series hybrid vehicle described in the "Internal Combustion Engine" section.

Others

The drive-system device to be interposed between the crankshaft and the driving wheels is not limited to a stepped transmission, and may be, for example, a continuously variable transmission.

What is claimed is:

1. An internal combustion engine condition determination apparatus, comprising:
    a memory that stores mapping data for defining mapping that uses an internal combustion engine state variable as an input and outputs a determination result related to a condition of an internal combustion engine, the internal combustion engine state variable being a parameter indicating the condition of the internal combustion engine, the mapping including a neural network and a softmax function for normalizing a plurality of output values from the neural network; and
    a processor configured to:
        acquire the internal combustion engine state variable;
        input the acquired internal combustion engine state variable to the neural network of the mapping;
        execute, when a maximum value among the plurality of output values from the neural network falls out of a predetermined permissible range, a guard process for obtaining a new output value by adjusting the maximum value to a value within the permissible range;
        normalize the output values with the softmax function;
        make determination about the determination result related to the condition of the internal combustion engine based on at least a maximum normalized value among normalized values obtained by normalizing the output values; and obtain new output values in the guard process by adjusting the output values other than the maximum value among the plurality of output values from the neural network without changing a magnitude relationship with the other output values.

2. The internal combustion engine condition determination apparatus according to claim 1, wherein the processor is configured to obtain, when the maximum value among the plurality of output values from the neural network is larger than an upper limit value of the predetermined permissible range, the new output value in the guard process by reducing the maximum value to the value within the permissible range.

3. The internal combustion engine condition determination apparatus according to claim 2, wherein the processor is configured to reduce, in the guard process, the maximum value among the output values to a value that falls within the permissible range and is equal to or larger than a second lower limit value larger by a predetermined amount than a first lower limit value that is a lower limit value of the permissible range.

4. The internal combustion engine condition determination apparatus according to claim 1, wherein the processor is configured to obtain, when the maximum value among the plurality of output values from the neural network is smaller than a first lower limit value that is a lower limit value of the predetermined permissible range, the new output value in the guard process by increasing the maximum value to the value within the permissible range.

5. The internal combustion engine condition determination apparatus according to claim 4, wherein the processor is configured to, when the maximum value among the output values falls within the permissible range and is smaller than a second lower limit value larger than the first lower limit value by a predetermined amount:
   obtain the new output value in the guard process by increasing the maximum value to a value that is equal to or smaller than an upper limit value of the permissible range and equal to or larger than the second lower limit value; and
   obtain the new output values in the guard process by increasing the output values other than the maximum value among the plurality of output values from the neural network without changing the magnitude relationship with the other output values.

6. The internal combustion engine condition determination apparatus according to claim 1, wherein:
   the processor is configured to obtain, when the maximum value before the guard process is smaller than the new output value after the guard process, the new output values in the guard process by increasing the output values other than the maximum value among the plurality of output values from the neural network by amounts corresponding to a difference between the maximum value before the guard process and the new output value after the guard process; and
   the processor is configured to obtain, when the maximum value before the guard process is larger than the new output value after the guard process, the new output values in the guard process by reducing the output values other than the maximum value among the plurality of output values from the neural network by amounts corresponding to a difference between the maximum value before the guard process and the new output value after the guard process.

7. The internal combustion engine condition determination apparatus according to claim 1, wherein the processor is configured to set, when a subset of the output values after the guard process is smaller than a first lower limit value that is a lower limit value of the permissible range, the subset of the output values smaller than the first lower limit value to agree with the first lower limit value.

8. The internal combustion engine condition determination apparatus according to claim 1, wherein:
   the condition of the internal combustion engine is whether the internal combustion engine is misfiring;
   the mapping data defines mapping that uses, as an input, time-series data of instantaneous speed parameters in a plurality of successive second intervals within a first interval and outputs a probability of misfire in the internal combustion engine;
   the processor is configured to acquire the instantaneous speed parameters based on detection values from a sensor configured to detect rotational behavior of a crankshaft of the internal combustion engine;
   the instantaneous speed parameter is a parameter based on a rotation speed of the crankshaft of the internal combustion engine;
   the first interval is a rotation angle interval of the crankshaft and includes a compression top dead center;
   the second interval is smaller than an existence interval of the compression top dead center; and
   the mapping outputs the probability of the misfire in at least one cylinder in which the compression top dead center exists within the first interval.

9. An internal combustion engine condition determination system, comprising:
   a memory that stores mapping data for defining mapping that uses an internal combustion engine state variable as an input and outputs a determination result related to a condition of an internal combustion engine, the internal combustion engine state variable being a parameter indicating the condition of the internal combustion engine, the mapping including a neural network and a softmax function for normalizing a plurality of output values from the neural network;
   a first processor mounted on a vehicle and configured to:
     acquire the internal combustion engine state variable;
     transmit acquired data to an outside of the vehicle; and
     receive a signal based on the determination result related to the condition of the internal combustion engine from a second processor; and
   the second processor arranged outside the vehicle and configured to:
     receive the data transmitted from the first processor;
     input the received internal combustion engine state variable to the neural network of the mapping;
     execute, when a maximum value among the plurality of output values from the neural network falls out of a predetermined permissible range, a guard process for obtaining a new output value by adjusting the maximum value to a value within the permissible range, the guard process including obtaining new output values by adjusting the output values other than the maximum value among the plurality of output values from the neural network without changing a magnitude relationship with the other output values;
     normalize the output values with the softmax function;
     make determination about the determination result related to the condition of the internal combustion engine based on at least a maximum normalized value among normalized values obtained by normalizing the output values; and transmit the signal based on the determination result related to the condition of the internal combustion engine to the vehicle.

10. A data analyzing apparatus comprising:
a storage device that stores mapping data for defining mapping that uses an internal combustion engine state variable as an input and outputs a determination result related to a condition of an internal combustion engine, the internal combustion engine state variable being a parameter indicating the condition of the internal combustion engine, the mapping including a neural network and a softmax function for normalizing a plurality of output values from the neural network; and
an execution device arranged outside a vehicle and configured to:
  receive the internal combustion engine state variable from the vehicle;
  input the received internal combustion engine state variable to the neural network of the mapping;
  execute, when a maximum value among the plurality of output values from the neural network falls out of a predetermined permissible range, a guard process for obtaining a new output value by adjusting the maximum value to a value within the permissible range, the guard process including obtaining new output values by adjusting the output values other than the maximum value among the plurality of output values from the neural network without changing a magnitude relationship with the other output values;
  normalize the output values with the softmax function;
  make determination about the determination result related to the condition of the internal combustion engine of the vehicle based on at least a maximum normalized value among normalized values obtained by normalizing the output values; and
  transmit a signal based on the determination result related to the condition of the internal combustion engine to the vehicle.

\* \* \* \* \*